United States Patent [19]

O'Sullivan

[11] 4,313,115
[45] Jan. 26, 1982

[54] COLLISION AVOIDANCE APPARATUS

[75] Inventor: James P. O'Sullivan, Purley, England

[73] Assignee: Sperry Limited, Bracknell, England

[21] Appl. No.: 32,056

[22] Filed: Apr. 23, 1979

[30] Foreign Application Priority Data

May 10, 1978 [GB] United Kingdom ............... 18604/78

[51] Int. Cl.³ ................................................ G01S 7/22
[52] U.S. Cl. ............................ 343/5 EM; 343/112 CA
[58] Field of Search ...................... 343/5 EM, 112 CA

[56] References Cited

U.S. PATENT DOCUMENTS

| 3,717,873 | 2/1973 | Riggs ............................. 343/5 EM |
| 3,725,918 | 4/1973 | Fleischer et al. ............... 343/5 EM |
| 4,224,621 | 9/1980 | Cornett et al. .................. 343/5 EM |

Primary Examiner—T. H. Tubbesing
Attorney, Agent, or Firm—Howard P. Terry

[57] ABSTRACT

Collision avoidance apparatus for assessing manoeuvres of a first vehicle (6) to avoid collision with other vehicles (22) in which closed regions are computed respectively associated with the other vehicles and which, if avoided by the first vehicle, will assure that the latter will not pass closer to the other vehicles than a predetermined distance (CPA). The periphery of each of said regions is defined by lines joining the following points:

the point (49) at which the first vehicle (6) would be at said predetermined distance (CPA) from the other vehicle (22) in question when on a heading to cause the other vehicle (22) to pass ahead (ahead CPA joint);

the possible point (51) of collision (PPC) of the first vehicle (6) and the other vehicle (22) based on the present speeds of the two vehicles and the present heading of the other vehicle; the point (52) at which the first vehicle (6) would be at said predetermined distance (CPA) from the other vehicle (22) in question when on a heading to cause the other vehicle to pass astern (astern CPA point);

and the points of intersection (56,57) of a line parallel to the heading of the other vehicle (22), and spaced from it by said predetermined distance (CPA on the side nearest to the first vehicle (6), with said astern and ahead headings of the first vehicle (6).

3 Claims, 14 Drawing Figures

COLLISION AVOIDANCE APPARATUS

This invention relates to apparatus for providing indicia for the assessment of possible maneuvers of a craft to avoid collision with intruding vehicles. The invention is particularly, but not exclusively, suitable for marine vessels and in the main will be discussed in relation thereto.

Radio and other aids to marine navigation have been utilized in the past for augmenting the look-out's ability visually to determine potential collisions between marine vessels. Radar systems and similar sensors have been used to determine the bearing rates and range rates corresponding to intruding vesssels. However, the detection of small bearing rates at large ranges does not lend itself to accurate instrumentation since small errors by the successive bearing readings destroy the accuracy of prediction of the closest point of approach (CPA) of the intruding vessel.

Other prior art collision warning techniques have utilized the measurement of passing distance at the closest point of approach. In such systems, radar indicators, reflection plotters and plotting tables are often used. However, errors of plotting can seriously degrade the reliability of these methods. Generally, an operator cannot accurately plot the data and assess from it the degree of danger associated with more than three intruding targets simultaneously. Semi-automatic transfer of radar data to plotting boards has been attempted, but the instrumentation is expensive. Also proposed have been quite extensive, though more accurate, photographic plotting systems. In these photographic systems, few errors can be introduced by the operator.

In addition to the above disadvantages, collision avoidance systems that utilize the CPA parameter suffer from a further disadvantage. When own ship changes heading, the time of CPA changes radically and in a manner difficult to visualize. Knowing only the coordinates of the presently predicted CPA does not permit the prediction of the heading or headings of own ship which may result in a collision. Conversely, a knowledge of the coordinates of a presently predicted CPA does not clearly inform the operator as to heading or headings that must be avoided. The character of displays emphasizing the CPA criterion is indeed such that it is possible to predict CPA data corresponding to only the threat along present ship's heading without any indication of dangers along a new course such as one to avoid a present danger. Displays of CPA's for trial headings and speeds have been incorporated in some devices in the past, but this approach is time consuming, incomplete, and requires the operator to remember the result of previous trials.

Typical collision warning systems of the abovedescribed type do not in a fully accurate or rapid manner furnish data directly usable in reliably assessing what maneuver own ship must make in order effectively to avoid an impending collision. The ship's operator must, upon observation of a collision potential, apply various rules and customs such as the international Rules of the Road and the Inland Rules of the Road which have been devised to prevent collisions. The Steering and Sailing Rules must also be followed when there is risk of collision. It is left to the ship's operator after the warning of an impending collision to exercise a difficult judgment as to what maneuver he must order the ship to make so as to remove the risk of collision. The required space for a safe maneuver depends upon knowledge of many factors, such as knowledge of the intruding vessel's future locations.

A collision avoidance system that endeavors to obviate the disadvantages discussed above utilizes the predicted or possible point of collision (PPC) parameter. Such a system is described in U.S. Pat. No. 3,717,873 issued Feb. 20, 1976 which displays the PPC of own ship with respect to intruding vessels. As explained in that specification, if it is desirable to miss the intruding vessels by a minimum predetermined distance, a circle of radius equal thereto may be displayed centered about each PPC. The ship's operator then steers his vessel to avoid having own heading intersect any of these circles which represent a predicted area of danger. It was discovered, however, that own ship when maneuvered to avoid the circles, under normally occurring dynamic situations, could pass closer to intruding vessels than the predetermined CPA distance. The actual passing distance achieved utilizing this prior display may be small enough to precipitate a collision situation.

U.S. Pat. No. 3,725,918 issued Apr. 3, 1973 discloses a system which improves upon that of U.S. Pat. No. 3,717,873 by replacing the circular predicted area of danger by a closed, elongated geometrical curve, preferably an ellipse. If the elliptical predicted area of danger is treated, as was the circular PAD, as an island to be steered cleared of, then at least a predetermined minimum passing distance is achieved with respect to all of the collision threats in the vicinity of own ship which represents an improvement over the system employing a circular predicted area of danger.

The elliptical predicted area of danger was drawn by determining two minimum changes in own ship heading which would provide new paths or heading for own ship arranged to pass ahead and astern, respectively, of the intruder vessel, the points of intersection of these headings with the path or heading of the intruder vessel defining the extent of the major axis of the ellipse, which was thus aligned with the heading of the intruder vessel, the minor axis being determined by the selected CPA (typically 1 nautical mile) and being equal to twice CPA. One of the disadvantages of this system is that once drawn, the elliptical predicted area of danger remains while the intruder vessel is in radar range even though at some time after first being identified, the vessel may be approaching a condition in which it no longer represents a complete hazard, e.g. the predicted area of danger no longer contains a PPC. While this system errs on the side of caution, it would be helpful to a navigator, particularly in congested waters, if some indication could be given when an intruder vessel is passing from the hazardous category to the non-hazardous category in order to give the navigator, at a glance, a more informative display.

Another problem which arises in congested waters is that a collision-free heading for own ship may not be apparent upon a strict adherence to the principal of never allowing the path of own ship to enter a predicted area of danger. In fact, since an elliptical predicted area of danger is a convention approximating (albeit safe) the actual danger area, it is possible to enter an elliptical predicted area of danger without creating a hazardous situation immediately. The navigator would be assisted considerably if a predicted area of danger continually changed to reflect the increasing or decreasing hazard which the intrusion represents.

To summarize, experience has shown that computer-aided processing of radar data has had a profound impact on the interpretation of the marine traffic encounter situation, providing essential and relevant information in a rapid and accurate manner hitherto obtained only indirectly and tediously by manual plotting which is susceptible to human error. Collision avoidance systems have highlighted the necessity for devoting careful attention to the selection of inputs of own ship speed and heading to the display drive circuits and to the data processor itself, as this choice exercises a direct influence on the accuracy and relevancy of the derived target motion parameters and upon the interpretation of the encounter hazard. It is further appreciated that although any radar data processor approach, including manual plotting, is susceptible to residual errors in speed and heading inputs, the fundamental CPA information—time interval to, and magnitude of, ultimate closest passing for present motions of own ship and target—is independent of the influences of these errors provided systematic observation has been conducted. This situation explains and emphasizes the fundamental strengths of the radar sub-system as an important aid to safety of navigation.

Furthermore, the techniques of displaying target hazard information by means of predicted areas of danger predicted area of danger as contained in the prior art, and now refined by the present invention, is known to provide additional and important advantages in assessment of the total situation displayed on the plan position indicator (PPI). A fundamental but previously unrecognized dichotomy in the display of collision hazard in respect to fixed terrestrial returns—the navigational problem—and with respect to ship targets—possessing a variety of motions—the collision avoidance problem—has been highlighted and resolved. When viewing the PPI of the fundamental relative motion radar, the navigator had an intuitive appreciation of the hazard posed by the surrounding returns from fixed terrestrial objects, such as land returns and navigation marks. It was discovered that this intuitive assessment strength did not extend to the interpretation of the motions of mobile ship targets. Many, if not all, of the successive difficulties of interpretation of the radar plot can be attributed to this dichotomy. When target motions are processed and hazard information displayed through the medium of a predicted area of danger, this dichotomy is resolved. At the moment of observation, the navigation and collision hazards are displayed in a single compatible format: the land returns are seen in their present locations with respect to own ship's position on the relative motion indicator and their future locations are assessed by visualizing own ship's future progress along the heading marker or, conversely, visualizing the future progress of the land across the PPI with the negative of own ship's components of motion. The predicted area of danger distribution is seen likewise in its present locations with respect to own ship's position and its future locations are assessed by visualizing own ship's progress along the heading marker. In general, both the present location of land returns and predicted area of danger and their future movements are assessed in one similar convention. This permits a direct and intuitive assessment of the total hazard situation, representing a significant contribution to effectiveness in information-handling and an improvement in safety.

According to the present invention apparatus for assessing maneuvers of a first vehicle to avoid collision with other vehicles comprises sensing means for providing signals representative of the positions and velocities of the first vehicle and the other vehicles, computing means responsive to said signals for computing closed regions respectively associated with said other vehicles, which regions if avoided by said first vehicle assure that the latter will not pass closer to said other vehicle than a predetermined distance for all relative positions and velocities thereof, and display means coupled to the computing means for displaying the regions relative to the position of said first vehicle, thereby providing indicia to assess maneuvers of said first vehicle to avoid collision with said other vehicles, the periphery of each of said regions associated with the other vehicles which represent hazards being defined by lines joining the following points:

the point at which the first vehicle would be at said predetermined distance from the other vehicle in question when on a heading to cause the other vehicle to pass ahead (ahead CPA point), the possible point of collision (PPC) of the first vehicle and the other vehicle based on the present speeds of the two vehicles, and the present heading of the other vehicle, the point at which the first vehicle would be at said predetermined distance from the other vehicle in question when on a heading to cause the other vehicle to pass astern (astern CPA point), and the points of intersection of a line parallel to the heading of the other vehicle, and spaced from it by said predetermined distance on the side nearest to the first vehicle, with said astern and ahead headings of the first vehicle, In respect of another vehicle representing a diminishing hazard (when a PPC will no longer exist), as opposed to a complete hazard, then said region is defined by joining directly the two remaining ahead CPA points and completing the closed area with the line parallel to the heading of the other vessel and the two remaining ahead headings of the first vehicle.

The shape for each region generated in accordance with the present invention is less elegant than the circle or ellipse used previously and furthermore, the region may not be symmetrical about the track of the associated vehicle. However, the information content of the display means is much improved and the completely hazardous and partially hazardous situations are distinguished clearly from each other thus eliminating a disadvantage of known collision avoidance apparatus. Also, the present invention enables accurate CPA data to be combined with a relative motion display which has long since been a user requirement.

Collision avoidance apparatus for a marine vessel in accordance with the present invention will now be described in greater detail, by way of example, with reference to the accompanying drawings, in which.

Figure 1:
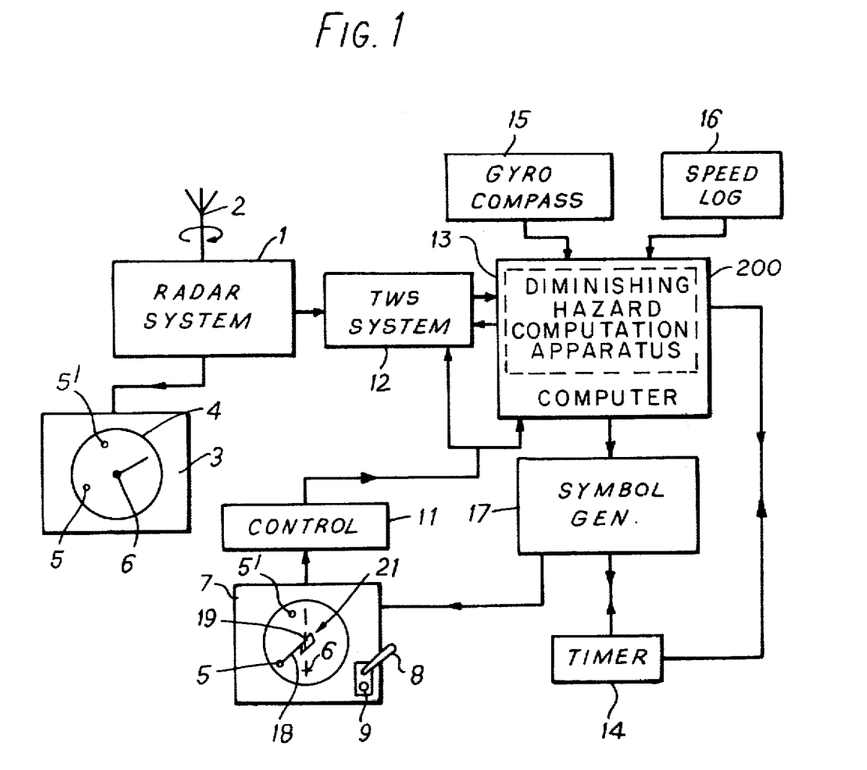
FIG. 1 is a block diagram of the apparatus.

The apparatus of FIG. 1 comprises a conventional azimuth scanning pulse radar system 1 of the type widely used in marine radar applications and employing a directive azimuth-scanning antenna 2. The radar antenna azimuth or bearing data and detected target range data is used to generate in a conventional way a type P or plan position indicator (PPI) display 3 on the screen of a cathode ray tube 4. Thus, when the display is an off-set type P display, all targets (moving and stationary) in the range of the radar 1 are periodically intensified on the screen of the cathode ray tube 4. A moving target in the form of a vessel is indicated at 5 while the location of own ship is represented at 6. Additional targets such as 5' will appear on the display 3, together with reflections from fixed obstacles including land masses, if present. The display 3 has a heading marker (a radial line extending from 6 to the periphery of the cathode ray tube 4), which indicates the present heading of own ship. Certain characteristics of images such as that of target 5 may be modified to enhance rapid recognition of those representing dangerous targets, as is customarily done in collision warning displays using the tau criterion principles which provide displays improving the operator's ability to discriminate between real and potential threats and nonthreats. However, the simple type P display is inherently a collision warning display and so it is shown in FIG. 1 as representative of collision warning or collision assessment displays in general.

The contents of the display 3 are repeated on a maneuver assessment display 7 which also employs a cathode ray tube. The display 7 is provided with target acquisition means comprising a joystick 8 and a button 9, by which selected targets can be entered into the maneuver assessment system yet to be described. The operator of own ship 6 normally selects all significant newly detected targets for acquisition and acquisition is effected by taking hold of the joystick 8, whereupon a circle (not shown) appears at the geometric center of the display 7. Movement of the joystick 8 results in movement of the circle which can thus be located over the target to be selected and the button 9 then pressed to effect acquisition. Depression of the button 9 actuates control means 11 the output of which is fed both to a conventional track-while-scan (TWS) system 12 and a computer 13. The TWS system 12 has an input connected to the output of the radar system 1 and has a two-way link with the computer 13. The computer 13 also has a two-way link with a timer 14 and receives inputs from a gyrocompass 15 and speed log 16 of own ship. An output of the computer 13 is fed to a symbol generator 17 which has a two-way link with the timer 14 and an output applied to the display 7 which produces a symbol associated with the selected target as will be described in greater detail hereinafter but can be seen associated with the acquired target 5 in the display 7 of FIG. 1 but not in connection with the non-acquired target 5'.

The TWS system 12 stores the rectangular or polar coordinates of each selected target and automatic lockon to signals received directly from the radar system 1 as the antenna 2 sweeps the respective selected targets is effected, so that the stored data for each selected target is updated automatically. Thus, for example, coordinates x and y and rates $\dot{x}$ and $\dot{y}$ may be stored for any target. Entry of a new or next apparently dangerous target generates a second set of x, y, $\dot{x}$ and $\dot{y}$ data for storage within the TWS system 12 for the newly-selected target. Such stored x, y, $\dot{x}$ and $\dot{y}$ data may be stored at the will of the operator in this manner for a plurality of intruding vessels for supply, upon demand and on a time-shared basis, to the computer 13. The TWS system 12 may be either analog or digital and may be supplied, if required, in a conventional manner by analog-to-digital or digital-to-analog converters as interface elements between various components of the system and the computer 13. It will be understood that the TWS system 12 is actually a type of computer device in itself, performing arithmetic functions, such as differentiation, and storing data. Therefore, it will be understood that its function may be performed either in a discrete unit, such as the separate system 12 shown in FIG. 1, or that its arithmetic and storage operations may be performed by respective arithmetic and storage elements present in the computer 13. The latter elements may perform other system functions in a conventional manner on a time-sharing basis.

The computer 13 has several computations to perform to assist in the generation of maneuver assessment symbols by the generator 17. It will be appreciated that the stored x and y coordinates of the various targets are readily available in the TWS system 12 and since the motions of the selected targets will be relatively slow compared with the speed of operation of even the simplest computer, it is seen that it is not necessary to compute all of the data in real time and, consequently, the threat or hazard data is conveniently stored and updated only periodically by the TWS system 12. It will also be understood that a plurality of symbols may be generated on a time-sharing or multiplexing basis using techniques well known in the analog and digital computer arts.

It will be apparent that the x and y coordinates of the target 5 substantially represent the present rectangular coordinates of the target vessel. However, it will be understood that the discussion of the location of target 5 and of the coordinate characteristics of other elements of the symbol to be generated could equally well be discussed in the same manner if polar coordinates were in use in the system. The computer 13 may be supplied with a self-contained clock or timing system which dominates the operation of other elements of the system, or it may be under the control of the separate timer 14. For example, the timer 14 may be synchronized with a clock internal of the computer 13. On the other hand, the timer 14 may represent the major system clock, determining the timing of the computer 13 by the agency of signals transmitted to it from the computer. In what follows, the timer 14 will, as a matter of convenience, be taken as the basic timer or clock control for the system.

The computer 13 may be programmed so as periodically to derive, from the TWS system 12, the x and y coordinates of the target 5 and to supply by well-known means coordinate values as control signals to the display 7 and thus to cause the cathode ray beam to be instantaneously intensified so as to form a bright spot at point 5 on the display 7. The next function of the computer 13 is to cooperate with the symbol generator 17 in forming a predicted track 18 of the target 5. The track 18 is drawn from the present position of the target 5 to a predicted point 19 of probable collision (PPC) determined by the relative position of the target vessel and its heading and speed and the present speed only of own ship 6. The computer 13 applies the x and y coordinates of target 5 to the symbol generator, and also supplies the x and y coordinates of the PPC 19, having used the x, y, $\dot{x}$ and $\dot{y}$ information generated by the TWS system 12 to generate such values. The symbol generator 17 will then supply, substantially instantaneously following the intensification of point 5, component sweep voltages for generating the track 18. Apparatus suitable for performing the function of the symbol generator 17, both in analog and digital forms, is well known in the art as discussed in U.S. Pat. No. 3,717,873, for example.

Following the generation of the vector representing the predicted track 18 of the target vessel 5, the x and y coordinates of the PPC 19 remain available in the computer 13 and are now used to generate a predicted area of danger 21 representing a region of possible collision surrounding the PPC 19. The track 18 and predicted area of danger 21 may be drawn simultaneously or nearly so, as desired. A dual gun cathode ray tube employing corresponding sets of electrostatic deflection electrodes for each electron beam permits drawing the track 18 with one gun-beam deflection system and the predicted area of danger 21 with the second gun-beam deflection system. Single gun operation with a single deflection system may be used, for example, with the track 18 being traced instantaneously prior to the tracing of the predicted area of danger 21.

The display 7 may employ an ordinary type of cathode ray tube in which the decay period of the phosphor on the display screen is selected so that a symbol traced in the past has substantially faded by the time the computer 13 calls for upgrading of the display. Regular or random erasure of the display may also be accomplished under the control of the computer 13 when a conventional direct viewing storage type of cathode ray display is employed. Such erasure may also be accomplished, as in the past, at any time desired by the operator.

Variations of the system illustrated in FIG. 1 are readily apparent that may lend even greater versatility to the maneuver assessment display system. It is seen that the acquisition means 8,9, or a similar device, may be used to pick off coordinate data from the display of a long range or early warning radar system or from a sonar display or other proximity warning display or device. By means of the TWS system 12, the operator may cause the system to lock on to, and to track, any selected hazard detected by any available sensor. The relative bearings and ranges of the targets locked into the automatic tracking operation are readily available in upgraded form for manipulation by the computer 13 for generating data required by the symbol generator 17 for producing the display 7.

Data, while present in the computer 13, may be manipulated or refined by the use of inertial stabilizing information such as generated by the gyrocompass 15 or speed log 16. In this manner, the threat bearing may be corrected for own ship roll, pitch or yaw motions in a conventional manner, as a refinement of the invention. Alternatively, the data generated by the radar system 1 may be provided with inherent stabilization features by the direct servo stabilization of the antenna scanner 2. Functions not directly related to the collision avoidance and maneuver assessment functions may also be performed by the computer 13 on a time-sharing basis, such as inertial navigational functions and the like.

Figure 2:
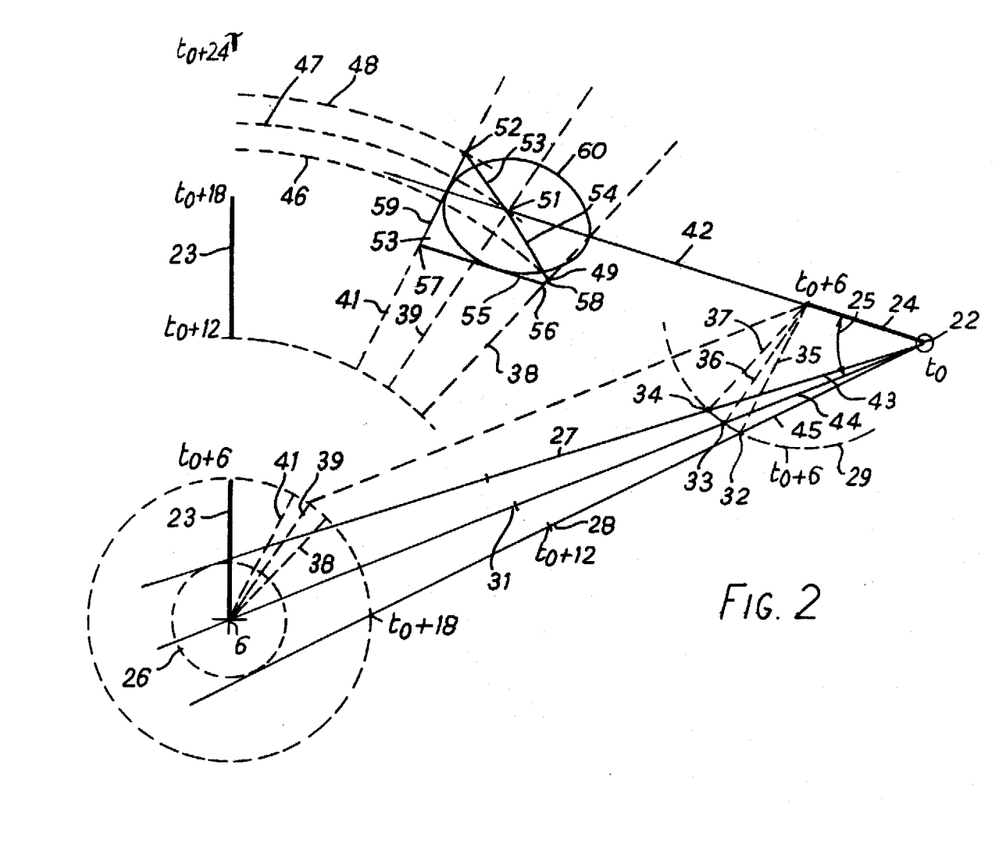
FIG. 2 is an explanatory diagram showing how a display of the apparatus is derived.

Turning now to FIG. 2, this is a diagram useful in explaining how the predicted area of danger for each target vessel is produced in accordance with the concept of the present invention. FIG. 2 shows the geometric, and hence computational relationship, between own ship 6 and a vessel 22 (termed the target) in an encounter situation. FIG. 2 represents a conventional radar PPI display with own ship 6 located at the display center and center of the coordinate reference system. The presentation mode is relative motion stabilized with own ship heading at the moment of initiation in the upright or top dead center position of the display. Own ship present heading, which may differ from the heading at initiation, is represented by a heading marker which is subdivided into alternate displayed and blanked 6-minute segments 23, as is conventional, based on data provided by the speed log.

The first brightened heading member segment 23 with origin at own ship 6 represents the radius of own ship 6-minute speed circle. For the purpose of the PPI display shown, own ship has a speed of 17.5 knots and its present heading is undefined.

The target vessel 22 is located at the 2 o'clock position relative to own ship 6 and is defined by a 6-minute vector 24 indicating the true motion progress of the target 22 in the same manner that the first segment of the heading marker 23 represents own ship true motion progress. The system operator will have selected the appropriate own ship heading and speed inputs to establish own ship true motion parameters, and the exact nature of the target true motion display output will reflect this choice. For the purposes of the present description, own ship gyro heading and single axis speed through the water are selected as system inputs as already described. The parameters of the target 22 represent target heading steered and its fore-and-aft speed through the water, assuming a homogeneous water mass. In this way, the aspect 25 of the target corresponds closely to the value which would be observed visually in a real encounter.

Having selected a minimum safe distance of separation (typically one nautical mile) in respect to the target vessel, the analysis proceeds as follows. A closest point of approach (CPA) circle 26 is inscribed about own ship 6 using the selected safe distance as the radius. Two tangents 27,28 are drawn from the target 22 to the CPA circle 26 thus establishing a prohibited sector from the target 22 to own ship 6 into which the relative motion path of the target 22 must be prevented from intruding by appropriate evasive maneuvering of own ship 6, if necessary.

A circle 29 of radius equivalent to 6 minutes of own ship motion, i.e. own ship velocity divided by ten, is inscribed about the end of the target 6-minute vector 24. This circle 29 may or may not intersect the two tangents 27,28 and a line 31 joining the target 22 and own ship 6, the line 31 representing the collision path, i.e. the path that the target relative motion vector would follow if the target 22 were on a collision heading with own ship 6. For the purposes of the present description, the radius of the circle 29 has sufficient magnitude to intersect each of the three lines once only at 32, 33 and 34. If the target 22 is faster than own ship 6, each of the three lines 27, 28, 31 will be intersected in two places. The three points of intersection 32, 33, 34 are connected by radial lines 35, 36, 37 to the center of the circle 29.

The three lines 35, 36, 37 thus generated represent own ship true vectors which, in conjunction with the target true vector, will result in relative tracks which cause the target to pass ahead of own ship, with the stipulated minimum safe distance of separation (line 27), to collide with own ship (line 31), or to pass astern of own ship, with stipulated minimum distance of separation (line 28), respectively. Having identified three own ship headings which result in specific magnitudes of target separation distances for own ship present or any other trial speed, based on the relative position and relative motion of the target vessel 22, it is possible to lay these own ship headings off from own ship position 6 as represented by lines 38, 39, 41 which are extended to intersect a projection 42 of the target true path.

Each of the three own ship headings has associated with it a 6-minute relative velocity vector, 43, 44, 45 of the target motion which permits calculation of the time interval for the target 22 to arrive at the CPA position (target passing ahead), to arrive at the PPC (zero separation), and to arrive at the CPA position (target passing astern). Using these time intervals, three speed circles 46, 47, 48 centered on own ship position 6 can be inscribed to intersect the respective own ship headings 38, 39, 41 with the lesser time interval for the target 22 passing ahead generating the circle 46 of least radius, the intersection 49 of this circle with the own ship heading 38 establishing the future position of own ship at the moment of closest point of approval (CPA) of the target 22 (passing ahead). In a similar manner the PPC is established at 51 by the intersection of the circle 47 and the heading 39, and the CPA position 52 (passing astern) by the intersection of the circle 48 and the heading 41. These three points 49, 51, 52 are disposed on or about the future position projection 42 of the target track.

Own ship operator is thus presented with three distinct items of information: he sees the headings of own ship at present or at a specifically selected own ship speed that will result in the target 22 passing clear by a predetermined distance (either ahead or astern) and the heading which will result in actual collision with the target 22; the operator also sees the positions of own ship when these events will occur. He thus has an indication of the time interval to each of these events, as represented by the 6-minute elements on the heading marker 23, repeated also on a variable bearing cursor not shown in FIG. 2.

The three points 49, 51, 52 in respect to the future motion of the target 22 are now used to define part of a predicted area of danger 53 into which own ship must not be allowed to intrude if separations less than that specified are to be avoided. The three points 49, 51, 52 are connected by two lines 53, 54. A further line 55 is drawn parallel to the target projected track 42 at the selected minimum separation distance from it to intersect the own ship heading lines 38 and 41 at points 56, 57 respectively. A line 58 is drawn between the point 56 and the ahead CPA point 49, and the predicted area of danger 53 is completed by a line 59 joining the point 57 with the astern CPA point 52. A region representing the true danger area is thus generated.

In general, target encounters will produce a variety of different initial conditions. Targets may occupy any position relative to own ship, may head in any direction, may be faster, slower or equi-speed with respect to own ship, or may be stationary. These variations will be reflected exactly in variations in the location, disposition and outline of the associated predicted area of danger. In the case of a faster target, there may be a second predicted area of danger within radar range or there may be no PAD, in which case only the target 6-minute vector will be displayed. A slower target will always have a single predicted area of danger, but it may be outside radar display range, in which case again only a 6-minute vector will be displayed.

Further variation is possible in the predicted area of danger configuration. For given own ship and target parameters, the radius of the speed circle 29 may intersect lines 27 and 31 but not line 28. This situation for a faster target represents a case where the two predicted areas of danger have blended together and it is not possible for own ship to manoeuvre at present speed to cause the target to pass astern. A situation may exist in which the circle 29 intersects the line 27 only, in two locations. The two lines from these intersection points to the tip of the target vector 24 represent two own ship headings which define a sector of own ship headings which, if a heading within that sector is adopted, will result in the target passing closer ahead than the stipulated minimum distance of separation. In this situation, however, there is no PPC and the predicted area of danger will be in the process of collapsing. The non-PPC predicted area of danger will be defined by a direct line between the two CPA positions 49 and 52, and the lines 55, 58 and 59. In this situation, the point 52 will have moved to the own ship side of the target track, 42.

FIG. 2 also shows an elliptical predicted area of danger 60 generated in accordance with the inventive concept of U.S. Pat. No. 3,725,918 to illustrate that while such a predicted area of danger is generally safe, it is possible to enter the same at certain points without danger and also possible for own ship 6 to be maneuvering with respect to the target 22 such that the predetermined minimum distance may be breached subsequently even though the elliptical predicted area of danger has not been entered. Thus it can be seen that the predicted area of danger 53 in accordance with the present invention provides a more accurate representation of the danger area. It is important to note, however, that the most important parameter in locating the predicted area of danger, namely the heading lines 38 and 41, are common to the elliptical predicted area of danger and the predicted area of danger of the present invention.

Figure 3:
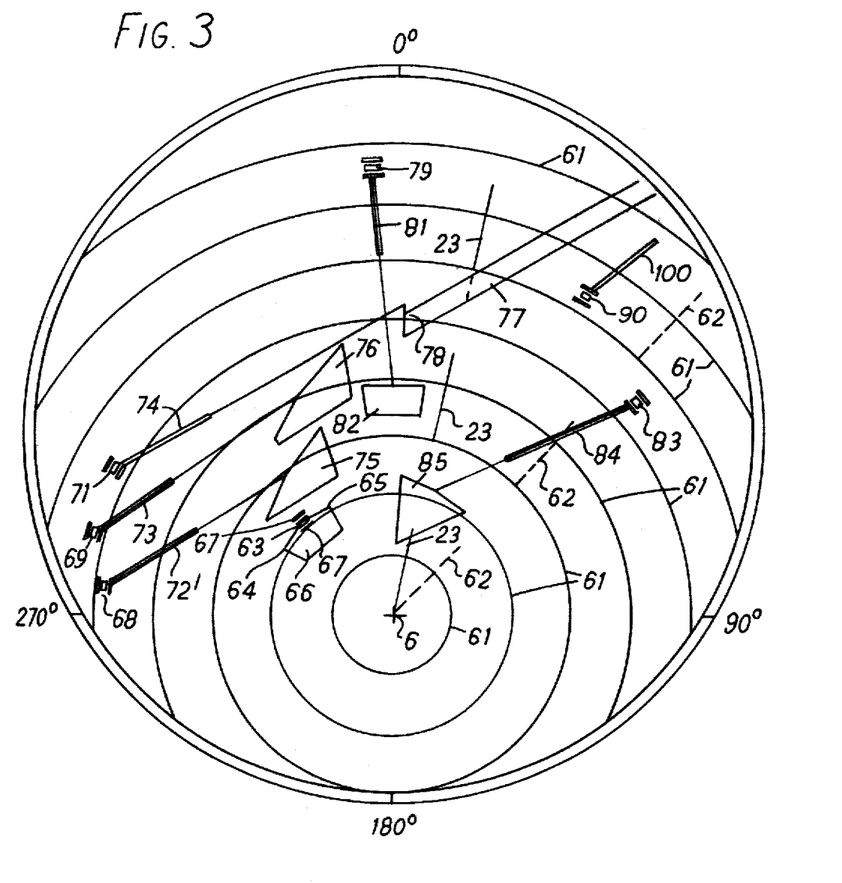
FIG. 3 is an enlarged view of a cathode ray tube display of FIG. 1.

FIG. 3 is an enlarged view of the display 7 of FIG. 1 but showing a plurality of acquired targets. The position of own ship 6 is represented by a synthetic cross which, as already explained, is offset from the center of the display and the latter indicates relative motion. Radar echoes will progress in time with velocity vectors which are the combination of the target velocity vector, if it exists, with the reverse or negative of own ship velocity vector. Echoes of stationary targets, whether other vessels, buoys or land masses will move across the display in the opposite direction to own ship progress and with a speed equivalent to own ship speed. Targets in motion, representing traffic within radar display range, generating video responses which are created on the display, will move in a complex manner described by the following vectorial equation:

$$\vec{V}_{R(\delta t)} = \vec{V}_{T(\delta t)} + (-\vec{V}_{o(\delta t)})$$

Where-
$\vec{V}_R$ is a vector representing the magnitude and direction of a target's relative velocity over some finite observation or plotting interval, $\delta t$.
$\vec{V}_T$ is a vector representing the true or absolute magnitude and direction of the target's motion in the same interval, $\delta t$.
$-\vec{V}_o$ is the reversed or negative value of own ship's motion in the interval, $\delta t$.

Conventional radar plot extraction is concerned with observing $\vec{V}_R$ to obtain an assessment of the hazard generated by a radar target and extracting $\vec{V}_T$ to provide supplementary data. Where a hazard is identified as real, by which is meant that $\vec{V}_R$ is directed towards own ship position 6, the influences of variation in $\vec{V}_o$ on $\vec{V}_R$, assuming $\vec{V}_T$ remains fixed, have to be investigated. The present invention is concerned with performing this analysis and exhibiting the resultant intelligence in an advanced and ergonomically sound manner by way of a predicted area of danger associated, where appropriate, with each target.

As already stated, a heading marker 23 is generated for own ship 6 based on data provided by the gyrocompass 15. The value of own ship heading is further indicated by means of a 3-digit indicator (not shown) located above the display 7. Own ship present speed is indicated similarly by an indicator (also not shown) with 3 digits reading to one decimal place. For the purposes of FIG. 3, own ship 6 is provided with a heading of 325° and the speed input from the speed log 16 is assumed to be 15.0 knots. Range rings 61 concentric with the position of own ship 6 are inscribed at intervals of 1 nautical mile. The operator has control of the direction of an electronic bearing cursor 62, which is shown by a broken line sub-divided into alternate brightened and blanked 6-minute vectors as is the heading marker 23. The direction of the electronic bearing cursor 62 is indicated by a separate dedicated 3-digit readout (not shown).

FIG. 3 shows a variety of seven acquired targets posing different degrees of collision hazard in respect to present and future positions of own ship 6. For the purposes of this illustration, it is assumed that own ship is approaching a traffic separation zone with the intention of crossing it. A target 63 is a stationary target, displaying a zero velocity vector, two CPA positions 64, 65 and a predicted area of danger 66 into which own ship must not intrude if the stipulated minimum distance of separation is to be preserved. For the purposes of illustration, a CPA distance of 0.5 nautical miles is presupposed. The stationary target 63 is enveloped by matched computer-generated tracking "eyebrows" 67 as is conventional. This stationary target 63 could represent a buoy marking the edge of a traffic separation zone.

Targets 68, 69, 71 represent vessels on the port bow of own ship 6 whose respective true vectors 72, 73, 74 represent the predicted motion of these vessels over the next 6-minutes of time. All three targets 68, 69, 71 are in a crossing situation with respect to own ship 6, and each has a predicted area of danger associated therewith, generated as explained with reference to FIG. 2 and indicated at 75, 76 and 77, respectively. The location of predicted area of danger 75 with respect to the future progress of own ship as represented by the heading marker 23 indicates that own ship 6 will pass clear ahead of this vessel. Target 68 is slightly faster than own ship 6 determined by comparing the length of target 6-minute vector 72 with own ship 6-minute vector 23. The predicted area of danger 76 conveys the intelligence that own ship 6 will likewise pass clear ahead of target 69. The predicted area of danger 77 associated with the target 71 differs significantly in shape from the predicted area of danger 75 and 76 and emphasizes the degree of hazard created by the target 71 compared with the targets 68 and 69. The target 71 is faster than own ship 6 and is in such a present position with respect to own ship that it is not possible for own ship to adopt a heading which, at present speed, would result in a collision with the target 71. Therefore, a PPC for this encounter does not exist. Two CPA points exist, however, one of which 78 is within the radar display range and is used to generate the predicted area of danger 77. Present heading of own ship represented by the heading marker 23 indicates that own ship 6 will intrude upon the predicted area of danger 77 in 24 minutes. A predicted area of danger located anywhere on own ship's heading marker 23 represents real hazard and indicates the necessity for, and the magnitude of, own ship heading change to eliminate the collision risk.

A target 79, with its associated true vector 81 and predicted area of danger 82, represents a vessel fine on the port bow of own ship 6 and at a zero aspect angle (at night, both red and green sidelights of target 79 would be visible). A further target 83 with true vector 84 is on the starboard bow of own ship 6, at a range of 5.5 nautical miles, showing a fine red sidelight as it crosses from starboard to port. The associated predicted area of danger 85 is disposed on own ship heading marker 23 some 9 minutes ahead in time and represents a real hazard requiring immediate evasive action of own ship 6. Another target 90 is shown displaying a 6-minute vector 100 devoid of a predicted area of danger and this represents a non-hazardous target. Either a predicted area of danger for target 86 exists, but lies outside the present radar display range, or the target does not possess a predicted area of danger.

The electronic bearing cursor 62 is shown positioned on a true direction of 355°, which represents a possible alteration of heading to starboard for own ship 6 that eliminates all risk in the foreseeable future, i.e. the cursor does not intrude into any predicted area of danger currently displayed, with the exception of predicted area of danger 77, already discussed.

Figure 4:
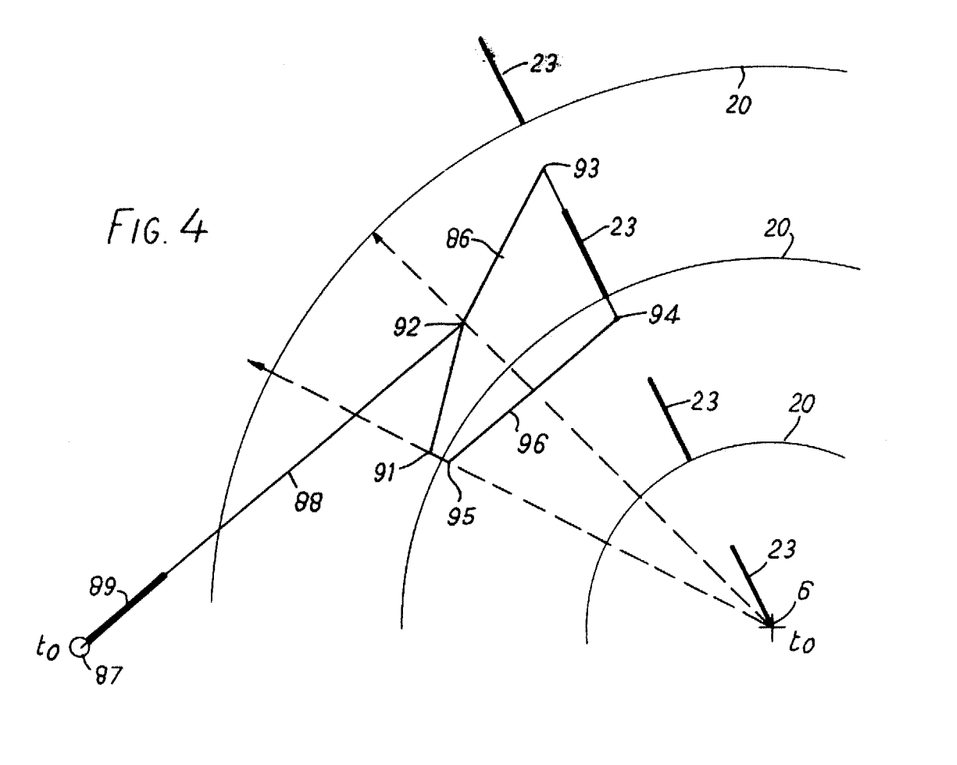
FIGS. 4 to 13 show the sequence of change of one part of the display of FIG. 3.

FIG. 3 illustrates very clearly that each target has a unique predicted area of danger and that it is considered preferable to define the same as accurately as possible by emphasizing the actual location of the CPA points rather than relying on circles and ellipses encompassing these points as in the prior art. It will be appreciated that the shape and position of a given predicted area of danger changes with time and the display 7 is continually updated in this respect, whereby the operator of own ship 6 has displayed to him the current situation and can tell at a glance whether a target represents an increasing or decreasing hazard which means that confirmation, or otherwise, that an own ship maneuver will be effective is forthcoming from the actual display 7 which is a significant advance in the art. This feature of the collision avoidance apparatus of analyzing a collision encounter in a dynamic sense will be described more fully with reference to FIGS. 4 to 13 which show a typical sequence of change, with respect to time, of a predicted area of danger 86 associated with a target 87. The target 87 is assumed to be a vessel moving at a speed greater than that of own ship 6 along a predicted track 88 part of which is defined by a 6-minute vector 89. In accordance with the present invention, the predicted area of danger 86 is defined by lines joining an ahead CPA point 91, a PPC 92, an astern CPA point 93 and points of intersection 94, 95 of a line 96 with the ahead and astern passing headings of own ship, the line 96 being drawn parallel to the target track 88, on the side adjacent own ship 6, and spaced from the track by the selected minimum passing distance which in this illustration is one nautical mile. FIG. 4 shows the relative positions of own ship 6 and target 87 at time $t_o$ and if own ship were to continue on present heading, it would reach the CPA point 93 in 33 minutes. Range rings at 2 nautical mile intervals 20, are shown.

Figure 5:
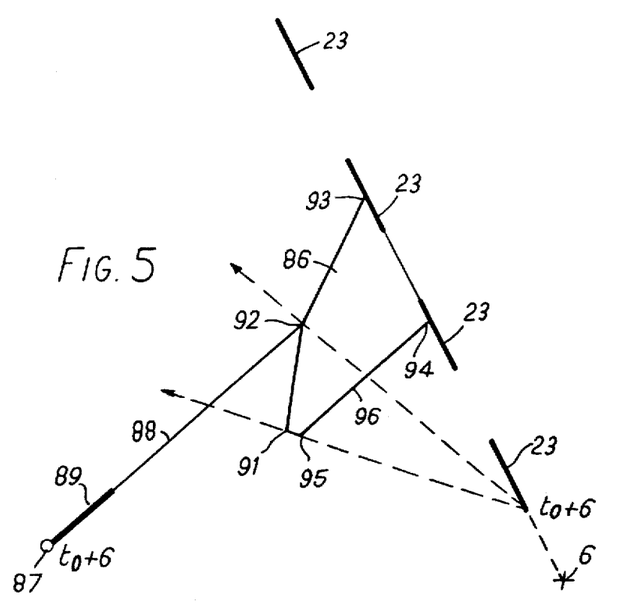
Figure 6:
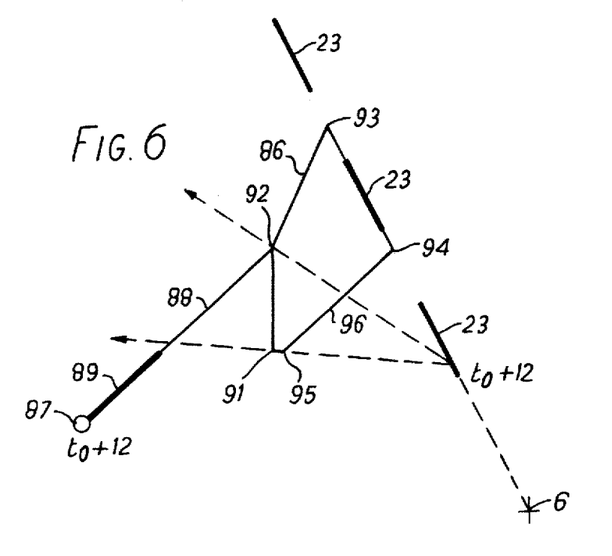

FIG. 5 shows the situation which exists at time $t_o +6$ minutes, the time interval to the CPA point 93 being reduced to 27 minutes. FIG. 6 represents the situation at time $t_o +12$ minutes, when the interval to CPA point 93 has reduced to 21 minutes.

Figures 7, 8:
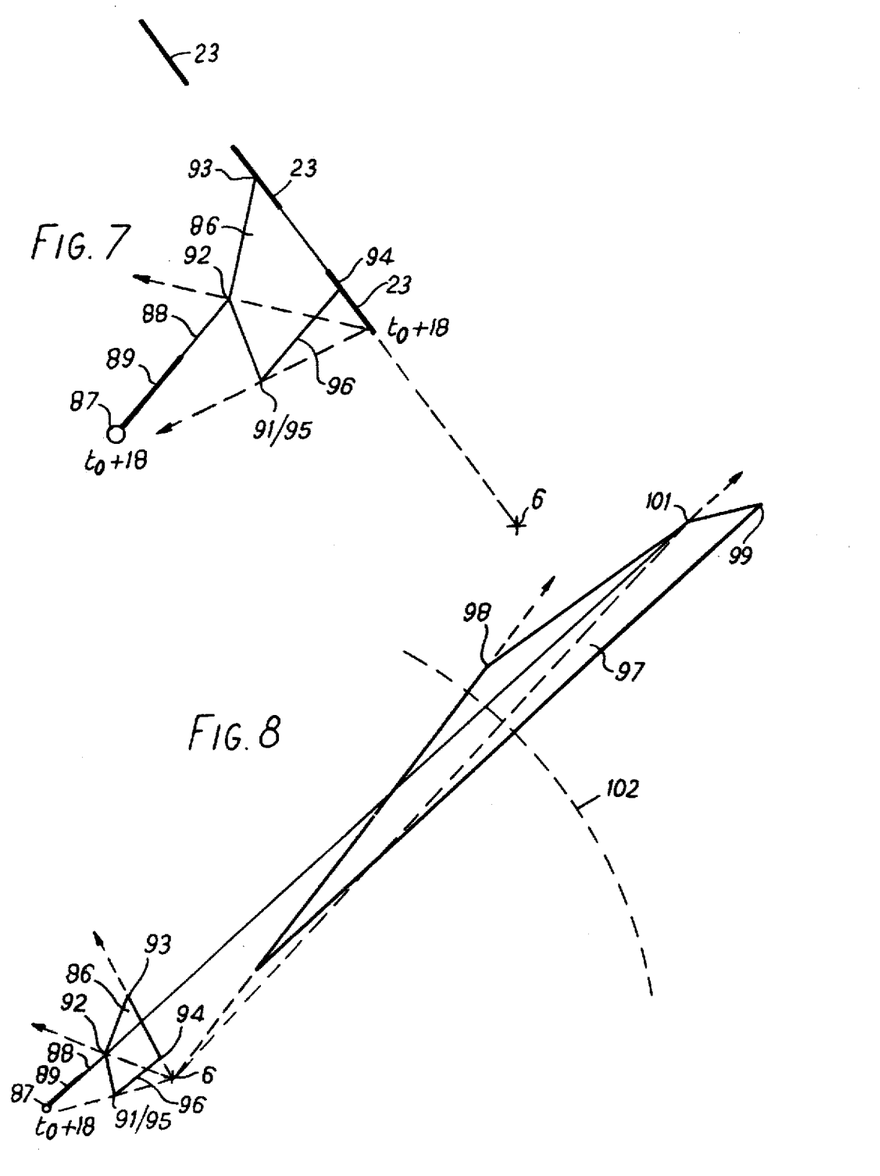

FIG. 7 shows the time interval to the CPA point 93 reduced to 15 minutes ($t_o +18$ minutes) at which the target 87 has reduced its range from own ship 6 but its relative bearing has rotated counter-clockwise, indicating that own ship will pass clear ahead of the target.

FIG. 8 also shows the situation at the time $t_o +18$ minutes on a reduced scale representing an increased radar display range. A second or dual predicted area of danger 97 has been computed with CPA points 98 and 99 and a PPC 101 but because none of these points are within radar display selected by the operator, as represented by the periphery 102 of the radar display, the predicted area of danger 97 is not displayed in FIG. 7.

Figures 9, 10:
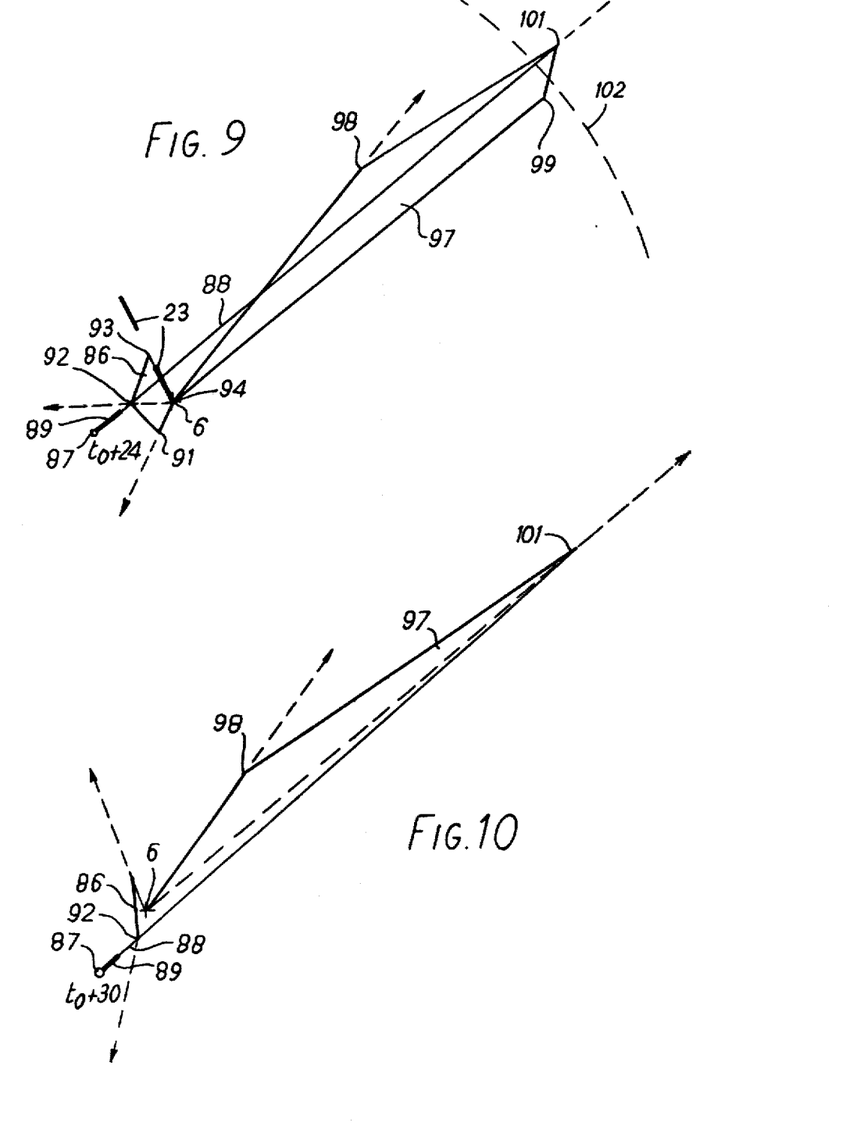

FIG. 9 shows the encounter situation at $t_o +24$ minutes. The time interval to the CPA point 93 is 9 minutes. As the further CPA points 98 and 99 are now within the selected radar display range, the dual predicted area of danger 97 is displayed. Own ship 6 had arrived some time earlier at the corner 94 of the predicted area of danger 86, at which time the apex of the dual predicted area of danger 97 had arrived at own ship position. Subsequently, as own ship continues to approach the CPA point 93, the apex of the dual predicted area of danger 97 will move with it and the primary predicted area of danger 86 will be rotated counter-clockwise.

FIG. 10 shows the situation at $t_o +30$ minutes. The CPA point 91 of predicted area of danger 86 and CPA point 99 of predicted area of danger 97 have now come together, thereby merging the primary and dual predicted area of danger astern of own ship 6. This represents the situation in which it is no longer possible for own ship 6 to turn with a view to making the target pass clear ahead.

Figures 11, 12, 13:
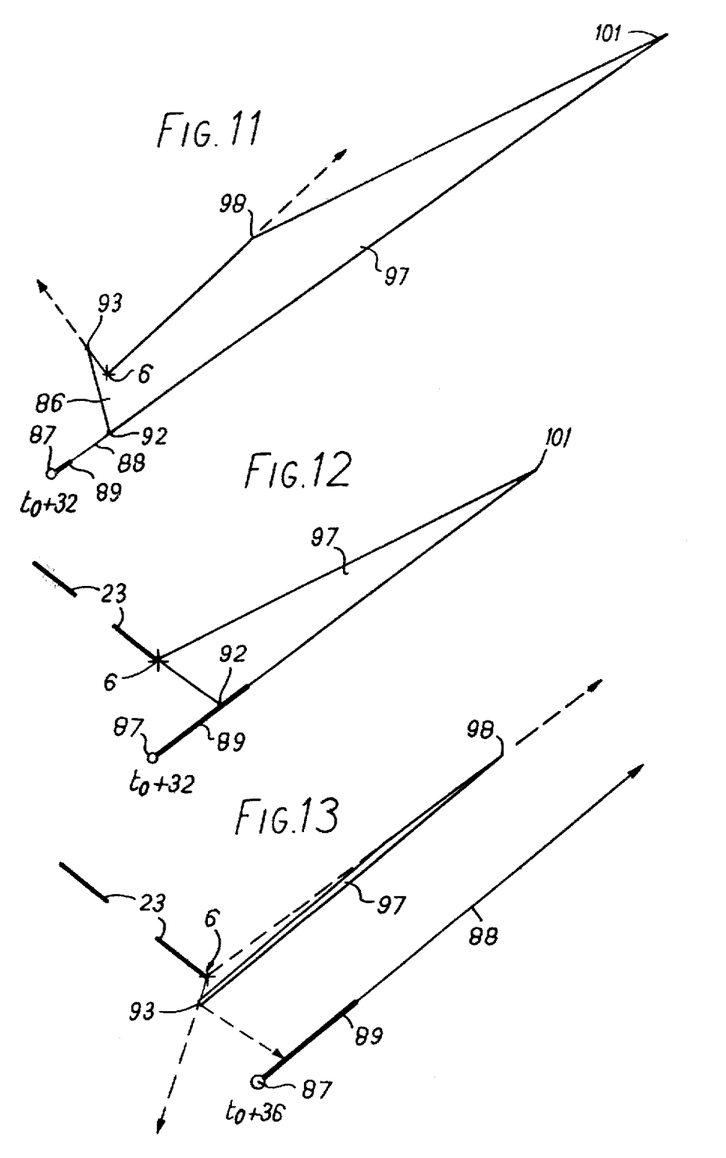

FIG. 11 shows own ship 6 moving closer to the CPA point 93, with the merged predicted area of danger 86 and 97 growing out astern. The CPA point 98 is now moving in astern of own ship 6.

In FIG. 12. own ship 6 has arrived at the CPA point 93 and the CPA point 98 of predicted area of danger 97 has blended with the CPA point 93 of predicted area of danger 86. Both PPC's 92 and 101 still exist but are beginning to close up.

FIG. 13 shows own ship 6 leaving the predicted area of danger behind. The CPA points 93 and 98 open up again, but the PPC's 92 and 101 no longer exist. The time is $t_o +36$ minutes and quickly thereafter the predicted area of danger shrinks in size and finally collapses, leaving the target 87 with only its 6 minute vector 89. FIG. 13 depicts the situation where the target 87 represents a diminishing hazard with respect to own ship 6. The predicted area of danger 97 comprises a line joining directly the two remaining CPA points 93 and 98, a line parallel to the heading line 88 of the target 87 and the two remaining ahead headings of own ship 6. The computer 13 includes, as part of its program, diminishing hazard computation apparatus 200 for generating the lines of the diminishing hazard danger zone 97.

The sequence of events when own ship 6 maneuvers in the vicinity of the predicted area of danger of a slower target is very similar to the above sequence with the following two differences:

(i) the dual predicted area of danger does not exist; and, (ii) the predicted area of danger never disappears as own ship reaches and passes beyond the CPA point. The predicted area of danger for a slower target is always present and will be displayed in all circumstances when it is with radar display range.

It will be clear to those skilled in the cathode ray display art that any of several well-known approaches may be used in tracing the various symbols on the screen of the cathode ray tube employed in the display 7. Type P scansion or raster scansion of the electron beam may be employed within the scope of the invention, each symbol being drawn by intensification of the electron beam as it is deflected across the locus of the symbol. The symbols may be drawn by well-known means during the fly-back or re-trace time between each such electron beam deflection, for example by one or by a series of deflections of the intensified beam during the fly-back time in a raster scanning system. Such methods are well-known in the art, as also are methods in which the regular polar or raster scanning of the intensified electron beam is not used. In such apparatus, symbols are generated by forming a programmed series of deflection strokes to form a symbol.

The mathematics forming the bases for the symbols created by the symbol generator 17 are known and are discussed for example in U.S. Pat. No. 3,725,918.

Figure 14:
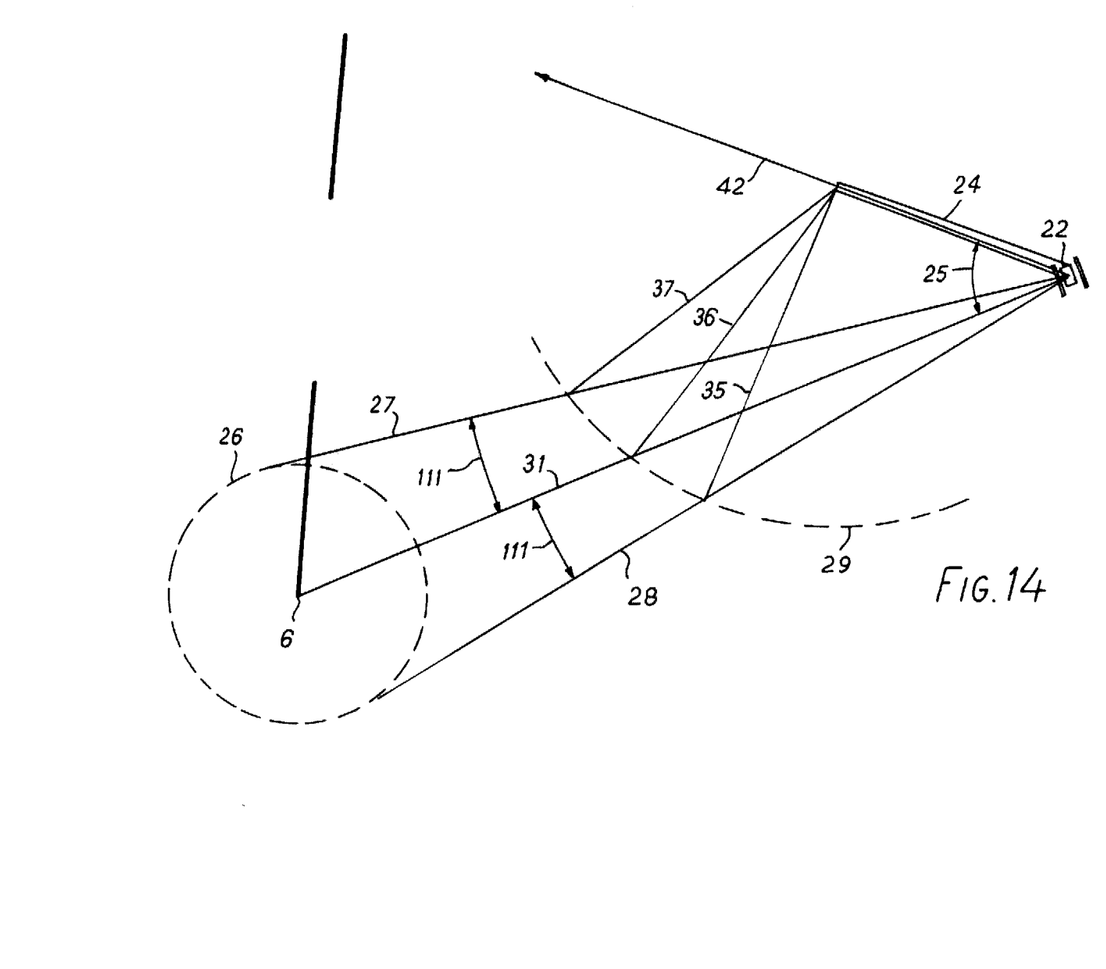
FIG. 14 is a view to a larger scale of part of FIG. 2.

Alternative mathematical approaches are available to the systems designer. For example, the approach which follows is based on a direct vectorial analysis. Reference will be made to FIG. 14 which shows part of FIG. 2 to a larger scale. The manner of computation of own ship vectors 37, 36, 35 and the location of the PPC and CPA points used to construct the predicted area of danger will be outlined.

The fundamental vectorial equation which links the derived target unit vector 24 ($\vec{T}$) with each of the required relative motion lines 27, 28 to establish the necessary own ship unit vector 35, 37 ($\vec{O}$) is:

$$\vec{T} + (-1)\vec{O}_1 = \vec{R}_1 \qquad (1)$$

where R = relative vector

The vectors with the subscript 1 will take up different values in connection with the relative track lines 27, 28, 31. This vector equation can be expressed in column matrix form as:

$$\begin{pmatrix} X_T \\ Y_T \end{pmatrix} + (-1) \begin{pmatrix} X_{01} \\ Y_{01} \end{pmatrix} = \begin{pmatrix} X_{R1} \\ Y_{R1} \end{pmatrix} \qquad (2)$$

The data can now be reorganized in terms of known and unknown prameters, the latter being underlined:

$$\begin{pmatrix} X_T \\ Y_T \end{pmatrix} - v_o \begin{pmatrix} \cos \underline{\psi_1} \\ \sin \underline{\psi_1} \end{pmatrix} = \underline{v_R} \begin{pmatrix} \cos f(\theta) \\ \sin f(\theta) \end{pmatrix} \qquad (3)$$

where $\psi_1$ is the heading for own ship to bring about any of the derived relative motion lines and resultant CPA's;

$f(\theta)$ is the known diversion of the required relative motion line for ahead, zero CPA, or astern passing of the target, obtained from the expression $$f(\theta) = (\theta_A \pm \alpha\epsilon) \begin{cases} \text{ahead} \\ 0 \text{ CPA} \\ \text{astern} \end{cases} \quad (4)$$

$\theta_A$ is the present bearing of the target's relative position, measured in the sense of counterclockwise rotation from the West-East axis through own ship position 6;

$\alpha$ is a factor which assumes the value $-1$ when the target aspect angle 25 is green in the normal maritime convention;

$$\epsilon = \sin^{-1}\left(\frac{CPA \text{ distance}}{\text{target range}}\right) \text{ and} \quad (5)$$

represents the angular magnitude 111;

$v_O$ is the known magnitude of own ship vector O in unit time;

$v_R$ is the magnitude of the relative motion vector R in unit time.

Equation (3) establishes two simultaneous linear equations in two unknowns, $v_R$ and $\psi_1$, which generate the equation:

$$\sin\psi_1 - \tan f(\theta) \cos\psi_1 = \left(\frac{Y_T - X_T \tan f(\theta)}{v_O}\right) \quad (6)$$

using the classical trigonometrical substitution of:

$$\sin\psi_1 = \frac{2\tan\frac{\psi_1}{2}}{1 + \tan^2\frac{\psi_1}{2}}$$

$$\cos\psi_1 = \frac{1 - \tan^2\frac{\psi_1}{2}}{1 + \tan^2\frac{\psi_1}{2}}$$

a quadratic equation in $\tan\left(\frac{\psi_1}{2}\right)$ is created:

$$\tan^2\left(\frac{\psi_1}{2}\right)(\tan f(\theta) + C) + 2\tan\left(\frac{\psi_1}{2}\right) + (C - \tan f(\theta)) = 0 \text{ where } C = \frac{X_T \tan f(\theta) - Y_T}{v_O}$$

this equation is soluble for two values of $\psi_1$ related to each of the three conditions of passing represented by the relative motion lines 27,31,28. In the case of slower targets only, one of the values $\theta_1$ is inappropriate and once identified as such, can be discarded. Each value of $\psi_1$ will have a unique value of $v_R$ associated with it which is derived by a re-iteration of equation (2). The time interval to CPA ($T_{CPA}$) is computed from the expression:

$$T_{CPA} = \left[\frac{\sqrt{(r_A)^2 - (D_{CPA})^2} \begin{array}{l}\text{ahead}\\ 0 \text{ CPA}\\ \text{astern}\end{array}}{v_R}\right] \text{ hours} \quad (8)$$

where $D_{CPA}$ = preselected CPA distance The equations (1) to (8) are sufficient to calculate all parameters required to locate the points which define the predicted area of danger in accordance with the present invention.

The advantages of a collision avoidance apparatus in accordance with the invention are as follows:

1. A more realistic comprehensive and a more operationally acceptable representation of a predicted area of danger is achieved.

2. Time and distance to CPA points are shown accurately on the display.

3. The PPC and non-PPC situations are clearly distinguishable in terms of predicted area of danger shape and a second predicted area of danger associated with a target will not be displayed unless a CPA point or PPC thereof is within radar range.

4. The gradual reduction of the predicted area of danger as a faster target passes clear of own ship is represented in a realistic manner.

5. The breakdown in the elliptical or circular predicted area of danger conventions which occurs whenever the target predicted track passes closer to own ship than the CPA distance is avoided, thereby improving software algorithms.

6. With the known predicted area of danger formats, own ship is prohibited from entering a predicted area of danger if the selection minimum passing distance is to be preserved. With the present invention, own ship may approach and enter a predicted area of danger which will then move with own ship while the escape maneuver options tend to diminish. Thus, at a given moment, the true restriction of the danger area is represented.

I claim:

1. Apparatus for assessing maneuvers of a first vehicle to avoid collision with other vehicles comprising sensing means for providing signals representative of the positions and velocities of the first vehicle and the other vehicles, computing means responsive to said signals for computing closed regions respectively associated with said other vehicles, which regions if avoided by said first vehicle assure that said first vehicle will not pass closer to said other vehicles than a predetermined distance for all relative positions and velocities thereof, the periphery of each of said regions being defined by lines joining the following points:

the point at which said first vehicle would be at said predetermined distance (CPA) from the other vehicle in question when on a heading to cause the other vehicle to pass ahead (ahead CPA point);

the possible point of collision (PPC) of said first vehicle and the other vehicle in question based on the present speeds of the two vehicles and the present heading of the other vehicle;

the point at which said first vehicle would be at said predetermined distance (CPA) from the other vehicle in question when on a heading to cause the other vehicle to pass astern (astern CPA point);

and the points of intersection of a line parallel to the heading of the other vehicle in question, and spaced from it by said predetermined distance (CPA) on the side nearest to said first vehicle, with said astern and ahead headings of said first vehicle, said computing means comprising means for computing said lines, and display means coupled to said computing means for displaying said regions relative to the position of said first vehicle, said display means comprising means for displaying said lines, thereby providing indicia to assess maneuvers of said first vehicle to avoid collision with said other vehicles.

2. Apparatus according to claim 1 wherein
at least one of said vehicles represents a diminishing hazard for which a PPC no longer exists relative to the first vehicle and the region for said at least one other vehicle is defined by further lines comprising a line joining directly the two remaining ahead CPA points, a line parallel to the heading of the other vehicle and the two remaining ahead headings of the first vehicle, and said computing means includes means for computing said further lines, said further lines being displayed on said display means.

3. Apparatus according to claim 4 or 5, wherein the computing means comprise a computer having a two-way link with both a track-while-scan system, to which the signals from the sensing means are applied, and a timer, an output from the computer being connected to a symbol generator having an output in turn connected to the display means and having a two-way link with the timer, the computing means further comprising control means connected between the display means on the one hand and the track-while-scan system and the computer on the other hand.

* * * * *